(12) United States Patent
Escudero Rodriguez et al.

(10) Patent No.: US 11,075,582 B2
(45) Date of Patent: Jul. 27, 2021

(54) SWITCHING CONVERTER

(71) Applicant: Infineon Technologies Austria AG, Villach (AT)

(72) Inventors: Manuel Escudero Rodriguez, Villach (AT); Matteo-Alessandro Kutschak, Ludmannsdorf (AT)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 16/843,250

(22) Filed: Apr. 8, 2020

(65) Prior Publication Data

US 2020/0328684 A1 Oct. 15, 2020

(30) Foreign Application Priority Data

Apr. 9, 2019 (EP) ..................................... 19168114

(51) Int. Cl.
*H02M 3/335* (2006.01)
*H02M 1/00* (2006.01)

(52) U.S. Cl.
CPC ...... *H02M 3/3353* (2013.01); *H02M 3/33507* (2013.01); *H02M 3/33576* (2013.01); *H02M 3/33592* (2013.01); *H02M 2001/0058* (2013.01)

(58) Field of Classification Search
CPC ......... H02M 3/33507; H02M 3/33576; H02M 3/33592
USPC ....................................... 363/17, 21.1, 21.18
See application file for complete search history.

(56) References Cited

U.S. PATENT DOCUMENTS

| 6,147,886 A | * | 11/2000 | Wittenbreder .... H02M 3/33592 363/95 |
| 2002/0122318 A1 | | 9/2002 | Guerrera |
| 2007/0025125 A1 | | 2/2007 | Nakahori et al. |
| | | (Continued) | |

OTHER PUBLICATIONS

Bazinet, John, "Phase-Shift Full-Bridge Controller Enables Efficient, Isolated Power Conversion for High Power Applications", Linear Technology Magazine, Nov. 2000, Accessed online at https://www.analog.com/en/technical-articles/phrase-shift-full-bridge-controller-enables-efficient-isolated-power-conversion.html on Feb. 18, 2020, pp. 11-14.

*Primary Examiner* — Gary A Nash
(74) *Attorney, Agent, or Firm* — Murphy, Bilak & Homiller, PLLC

(57) ABSTRACT

A phase-shifted full bridge (PSFB) switching converter includes a transistor full-bridge having first and second half-bridges. Each half-bridge includes a high-side transistor and a low-side transistor. A controller circuit is configured to generate a drive signal for each transistor. The (first/third and second/fourth) drive signals for the transistors of each half-bridge are periodic with a cycle period, pulse-width modulated and have a temporal offset to each other that equals half of the cycle period. The drive signals for the half-bridges are phase shifted-with respect to one another. The controller circuit also is configured to generate the first drive signal so that the first high-side transistor is switched off when the third drive signal indicates to switch on the second high-side transistor, and to generate the second drive signal so that the first low-side transistor is switched off when the fourth drive signal indicates to switch on the second low-side transistor.

11 Claims, 4 Drawing Sheets

(56) References Cited

U.S. PATENT DOCUMENTS

| | | | |
|---|---|---|---|
| 2008/0043495 A1* | 2/2008 | Jungreis | H02M 3/337 363/17 |
| 2009/0046482 A1* | 2/2009 | Smith | H02M 3/33569 363/17 |
| 2012/0147629 A1* | 6/2012 | Mao | H02M 3/28 363/17 |
| 2013/0033904 A1* | 2/2013 | Ye | H02M 3/3378 363/17 |
| 2013/0223103 A1* | 8/2013 | Pahlevaninezhad | H02M 3/337 363/17 |
| 2015/0029758 A1* | 1/2015 | Jacobson | H02M 3/33576 363/17 |
| 2015/0171729 A1* | 6/2015 | Scandola | H02M 3/158 363/21.02 |
| 2018/0048240 A1* | 2/2018 | Hayasaki | H02M 3/33584 |

* cited by examiner

SWITCHING CONVERTER

TECHNICAL FIELD

The present disclosure relates to the field of switching converters, in particular to a so-called phase-shifted full-bridge (PSFB) converter.

BACKGROUND

A PSFB converter can be used for DC-DC conversion in various applications. A PSFB converter provides voltage conversion as well as galvanic isolation from the input line voltage since this converter topology includes a transformer. Like other resonant or quasi-resonant converters, a PSFB converter can be operated to perform so-called Zero-Voltage-Switching (ZVS) with regard to the power transistors that switch the primary current passing through the transformer.

However, unlike in other fully resonant topologies (LLC converter topology or Dual Active Bridge, DAB, converter topology) losses due to circulating currents may occur in PSFB converters. These circulating currents do not contribute to the power transfer from the primary side to the secondary side of the transformer and thus may reduce efficiency. Especially in applications with wide input and/or wide output voltage ranges, circulating currents and the related losses may have a significant impact on the efficiency of the power conversion.

SUMMARY

A phase-shifted full bridge (PSFB) switching converter is described herein. In accordance with one embodiment the switching converter includes a transistor full-bridge composed of a first half-bridge and a second half-bridge. The first half-bridge includes a first high-side transistor and a first low-side transistor, and the second half-bridge includes a second high-side transistor and a second low-side transistor. The switching converter includes a controller circuit that is configured to generate a first drive signal for the first high-side transistor, a second drive signal for the first low-side transistor, a third drive signal for the second high-side transistor and a fourth drive signal for the second low-side transistor. The first drive signal and the second drive signal are periodic with a cycle period and pulse-width modulated and have a temporal offset to each other that equals half of the cycle period. Similarly, the third drive signal and the fourth drive signal are also periodic with the cycle period and pulse-width modulated and have a temporal offset to each other that equals half of the cycle period. The first and the second drive signal are phase shifted-with respect to the third and the fourth drive signal. Further, the controller circuit is configured to generate the first drive signal so that the first high-side transistor is switched off when the third drive signal indicates to switch on the second high-side transistor, and to generate the second drive signal so that the first low-side transistor is switched off when the fourth drive signal indicates to switch on the second low-side transistor.

Furthermore, a method for controlling a phase-shifted full bridge switching converter is described herein. In accordance with one embodiment the method includes generating a first drive signal for a first high-side transistor, a second drive signal for a first low-side transistor, a third drive signal for a second high-side transistor and a fourth drive signal for a second low-side transistor of the switching converter. The first drive signal and the second drive signal are periodic with a cycle period and pulse-width modulated and have a temporal offset to each other that equals half of the cycle period. Similarly, the third drive signal and the fourth drive signal are also periodic with a cycle period and pulse-width modulated and have a temporal offset to each other that equals half of the cycle period. Thereby, the first and the second drive signal are phase shifted-with respect to the third and the fourth drive signal. Further, the first drive signal is generated so that the first high-side transistor is switched off when the third drive signal indicates to switch on the second high-side transistor, and the second drive signal is generated so that the first low-side transistor is switched off when the fourth drive signal indicates to switch on the second low-side transistor.

BRIEF DESCRIPTION OF THE DRAWINGS

The invention can be better understood with reference to the following drawings and descriptions. The components in the figures are not necessarily to scale; instead emphasis is placed upon illustrating the principles of the invention. Moreover, in the figures, like reference numerals designate corresponding parts. In the drawings.

DETAILED DESCRIPTION

Figure 1:
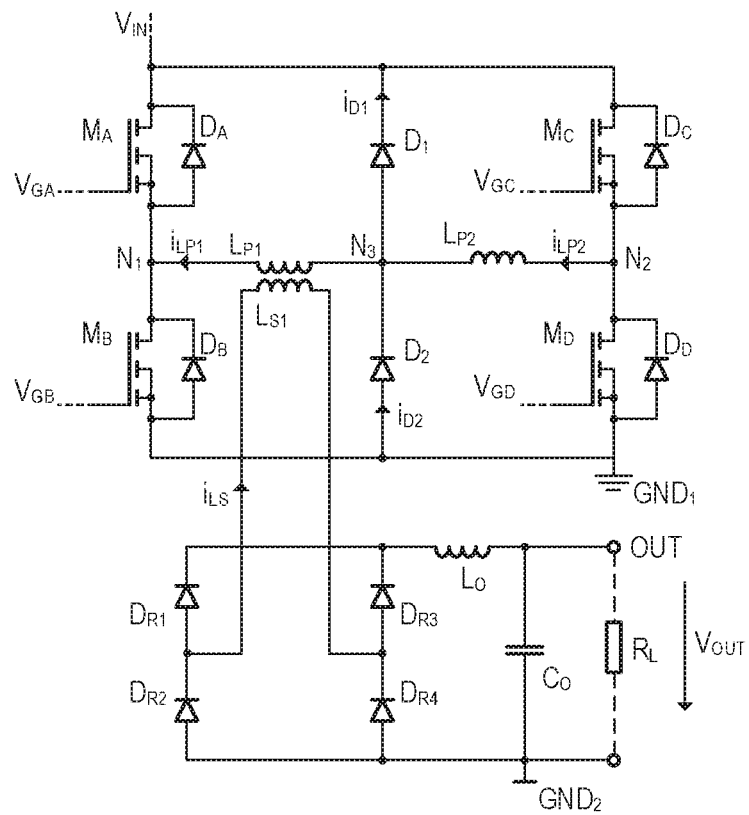
FIG. 1 illustrates one example of a PSFB converter.

FIG. 1 illustrates one exemplary implementation of a PSFB converter. Accordingly, the PSFB converter includes four power electronic switches that form a full-bridge on the primary side of a transformer. In the present example, the power electronic switches are implemented as metal-oxide-semiconductor field-effect transistors (MOSFETs) labelled $M_A$, $M_B$, $M_C$, and $M_D$, in FIG. 1. However, other types of power electronic switches such as IGBTs or the like may also be used. Each one of the MOSFETs has an intrinsic reverse diode (body diode) which are labelled $D_A$, $D_B$, $D_C$, and $D_D$, respectively.

The transistors $M_A$ and $M_B$ form a first half-bridge and the transistors $M_C$ and $M_D$ form a second half-bridge. Both half-bridges are connected between a first supply terminal, at which an input voltage $V_{IN}$ is provided, and a second supply terminal GND1 (e.g. ground terminal), which is connected to a reference potential. The half-bridge output node $N_1$ of the first half bridge is connected to a first end of an inductor $L_{P1}$, which is the primary winding of a transformer. The half-bridge output node $N_2$ of the second half bridge is connected to a first end of a further inductor $L_{P2}$. The second end of the inductor $L_{P1}$ and the second end of the further inductor L are connected at circuit node $N_3$, which is also coupled to the first supply terminal via free-wheeling diode $D_1$ and to the second supply terminal $GND_1$ via free-wheeling diode $D_2$.

The inductor $L_{S1}$, which is the secondary winding of the mentioned transformer, is connected to a rectifier, which is, in the present example, a bridge rectifier composed of diodes $D_{R1}$, $D_{R2}$, $D_{R3}$, and $D_{R4}$. It is noted that other types of rectifiers may be used instead of the depicted bridge rectifier. In one specific embodiment, a synchronous bridge rectifier is used instead of the diode bridge rectifier. In cases, in which the secondary inductor has a middle tap, two diodes (or transistors in case of a synchronous rectification) may be sufficient to rectify the secondary current $i_{LS}$. A further inductor $L_O$ is connected between one output node of the bridge rectifier and an output terminal OUT of the PSFB converter, wherein the other output node of the bridge rectifier is connected to reference terminal $GND_2$ that forms the ground terminal for circuit components on the secondary side of the transformer. The capacitor $C_O$ is connected between the output terminal OUT and the reference terminal $GND_2$. The inductor $L_O$ and the capacitor $C_O$ basically form a low-pass filter for reducing the ripple of the output voltage $V_{OUT}$. The load resistor $R_L$ connected in parallel to the output capacitor $C_O$ is a placeholder for any load that may be connected to and supplied by the PSFB converter.

Drive signals $V_{GA}$, $V_{GB}$, $V_{GC}$, and $V_{GD}$ for driving the power electronic switches (i.e. gate voltages for driving the gate electrodes of the transistors $M_A$, $M_B$, $M_C$, and $M_D$ in the present example) can be generated using any known technique. Usually pulse-width modulation is used to modulate the drive signals in order to regulate the output voltage $V_{OUT}$. Suitable gate driver circuits for driving MOSFETs are as such known and thus not discussed here. The switching converter topology illustrated in FIG. 1 allows all the power electronic switches to switch with Zero Voltage Switching (ZVS) resulting in comparably low switching losses and an efficient power conversion.

Figure 2:
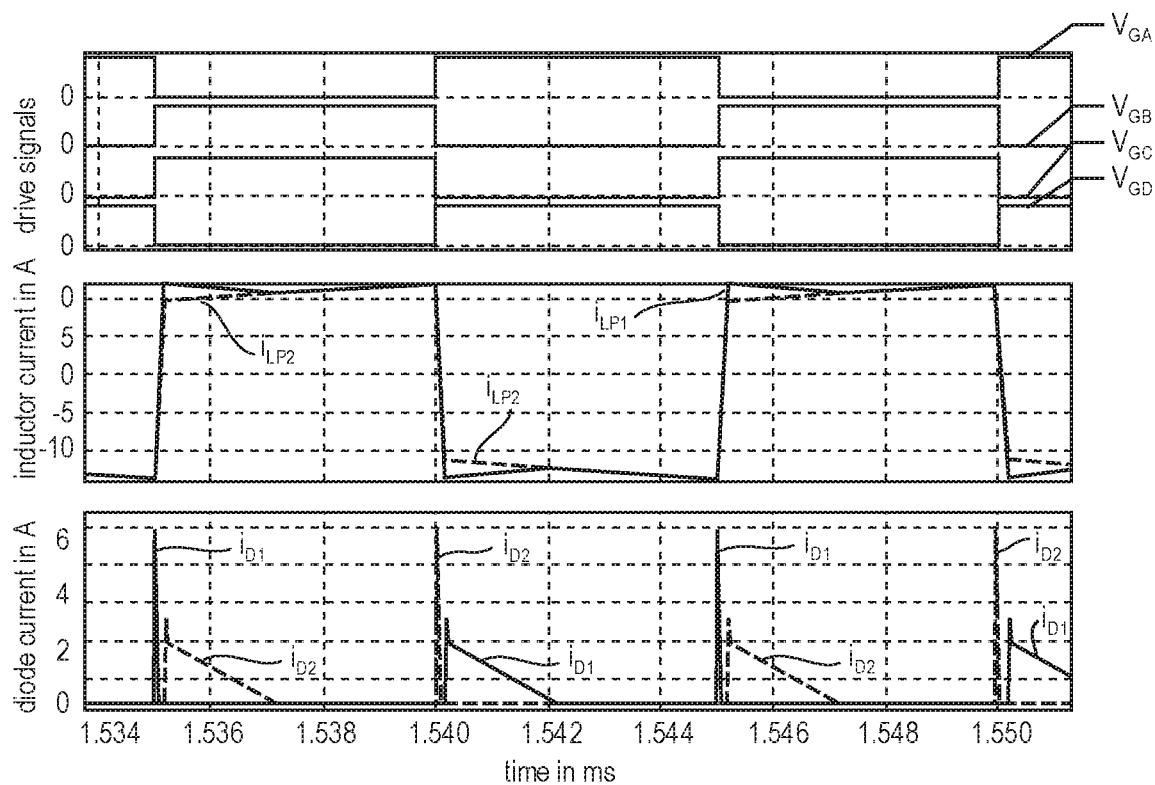
FIG. 2 illustrates one example of a common switching scheme that may be used to control the switching operation of the circuit of the PSFB converter of FIG. 1 in a situation, in which the input voltage is comparably low.

FIG. 2 includes timing diagrams illustrating examples of the control signals for driving the MOSFETs $M_A$, $M_B$, $M_C$, and $M_D$, the resulting inductor currents $i_{LP1}$ and $i_{LP2}$ passing through the inductors $L_{P1}$ and $L_{P2}$, as well as the corresponding diode currents $i_{D1}$ and $i_{D2}$ (also referred to as circulating currents) passing through the free-wheeling diodes $D_1$ and $D_2$. The depicted waveforms represent an operation of the PSFB converter of FIG. 1 at full load (specified maximum output current at nominal output voltage $V_{OUT}$) and at a minimum input voltage (e.g. 350 V) of a specified input voltage range. In this condition the circulating currents on the primary side are at their minimum and the converter efficiency is high. One can see in the bottom diagram of FIG. 2 that the spikes of the circulating currents $i_{D1}$, $i_{D2}$ with a peak of approximately six amperes are very short (only a few nanoseconds).

Figure 3:
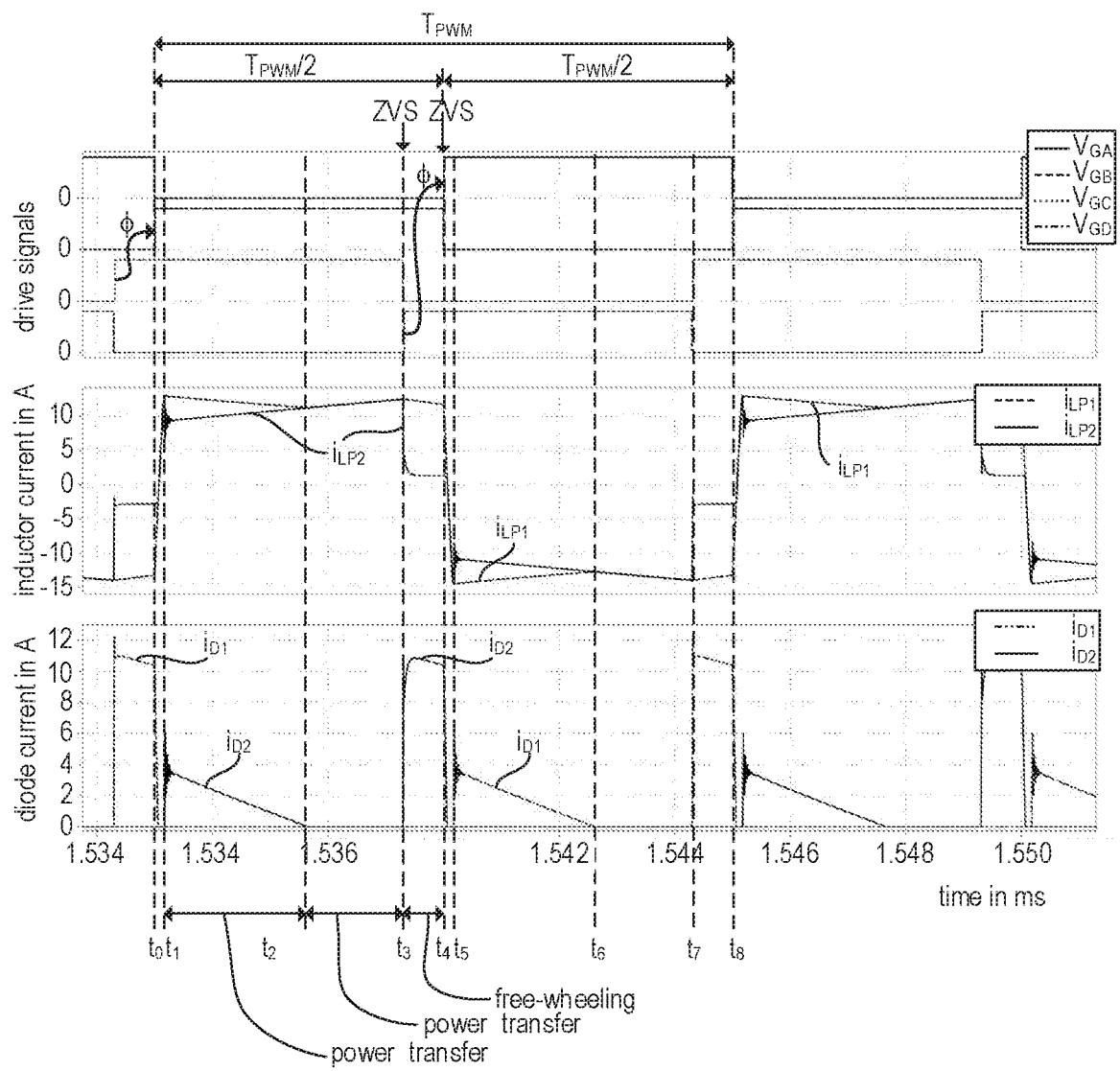
FIG. 3 illustrates how the phases of the switching signals change in the scheme of FIG. 2 when the input voltage is higher.

FIG. 3 includes the same waveforms as in FIG. 2 for a situation, in which the PSFB converter operates at full load and at a nominal input voltage (e.g. 400 V) of the specified input voltage range. One can see that in this condition the circulating currents $i_{D1}$, $i_{D2}$ are higher and the free-wheeling diodes $D_1$ and $D_2$ are in a forward-biased state for a significant longer time as compared with the situation illustrated in FIG. 2. Consequently, the efficiency is lower as compared with the situation illustrated in FIG. 2. The higher input voltage causes the output voltage controller circuit (not shown in FIG. 1) to set a phase shift φ between the rising edge of the drive signal $V_{GA}$ and the corresponding rising edge of the drive signal $V_{GD}$. The same phase shift can be observed between the rising edge of the drive signal $V_{GB}$ and the corresponding rising edge of the drive signal $V_{GC}$. In the embodiments described herein, all drive signals are periodic with a cycle period $T_{PWM}$ and pulse-width modulated with a duty cycle of 50 percent ($T_{ON}=T_{OFF}=T_{PWM}/2$). During operation, the controller circuit that generates the drive signals $V_{GA}$, $V_{GB}$, $V_{GC}$, and $V_{GD}$ may control/adjust the phase shift φ so as to maintain the output voltage $V_{OUT}$ at a desired set-point level. The drive signals of the transistors of the first half-bridge (i.e. $V_{GA}$ and $V_{GB}$) have a temporal offset to each other which equals half of the cycle period $T_{PWM}$ (i.e. 180° phase shift). The same applies to the drive signals of the transistors of the second half-bridge (i.e. $V_{GC}$ and $V_{GD}$). The mentioned phase shift φ corresponds to a time lag $\Delta t$ (temporal offset) which is equal to $T_{PWM} \cdot \phi/360°$ (when φ is provided in degrees), wherein $T_{PWM}$ is the duration of one switching cycle and the switching frequency is $T_{PWM}^{-1}$. It is noted that the PWM frequency $T_{PWM}^{-1}$ is not necessarily constant throughout the operation of the switching converter. In particular when the voltage controller circuit reacts in response to, e.g., a load change or an input voltage change, the phase shift φ will change and there may be one or more pulses with a different cycle time $T_{PWM}$. However, this behavior of the controller depends on the specific implementation of the controller and is part of the state-of-the-art PSFB control and thus not discussed in more details herein.

In the example of FIG. 3, the transistor $M_A$ is switched off and transistor $M_B$ is switched on at time instant $t_0$. Transistor $M_C$ is already on at this time and transistor $M_D$ is off. After a short dead-time, power transfer from the primary side to the secondary side of the transformer occurs between time instants $t_1$ and $t_3$ (power conversion phase). During this phase, the MOSFETs $M_B$ and $M_C$ are active (i.e. switched on) and diode $D_2$ is conducting between time instants $t_1$ and $t_2$ while diode current $i_{D2}$ decreases between time instants $t_1$ and $t_2$ and reaches zero at time instant $t_2$; during time instants $t_2$ and $t_3$ the diode current $i_{D2}$ is zero. During this power conversion phase (i.e. from time instant $t_1$ to $t_3$), the secondary current its passes through rectifier diode $D_{R2}$, secondary winding $L_{S1}$ of the transformer and rectifier diode $D_{R3}$.

At time instant $t_3$, MOSFET $M_C$ is switched off, whereas MOSFET $M_D$ is switched on (Zero Voltage Switching operation). Subsequently, between time instants $t_3$ and $t_4$ (free-wheeling phase) a free-wheeling current $i_{D2}$ passes through free-wheeling diode $D_2$ along the current path from diode $D_2$, via inductor $L_{P2}$ to MOSFET $M_B$. At the end of the free-wheeling phase, at time instant $t_4$, the MOSFET $M_B$ is switched off, whereas MOSFET $M_A$ is switched on (Zero Voltage Switching operation).

A short dead-time after time instant $t_4$ the next power conversion phase begins at time instant $t_5$. During this phase, the MOSFETs $M_A$ and $M_D$ are active (i.e. switched on) and diode $D_1$ is conducting between time instants $t_5$ and $t_6$ while diode current $i_{D1}$ decreases between time instants $t_5$ and $t_6$ and reaches zero at time instant $t_6$; during time instants to and $t_7$ the diode current $i_{D1}$ is zero. During this power conversion phase (i.e. from time instant $t_5$ to $t_7$), the secondary current $i_{LS}$ passes through rectifier diode $D_{R1}$, secondary winding $L_{S1}$ of the transformer and rectifier diode $D_{R4}$.

At time instant $t_7$, MOSFET $M_D$ is switched off, whereas MOSFET $M_C$ is switched on (Zero Voltage Switching operation). Subsequently, between time instants $t_7$ and $t_8$ (free-wheeling phase) a free-wheeling current $i_{D2}$ passes through free-wheeling diode $D_1$ along the current path from MOSFET $M_A$, via inductor $L_{P2}$ to diode $D_1$. At the end of the free-wheeling phase, at time instant $t_8$, the MOSFET $M_A$ is switched off, whereas MOSFET $M_B$ is switched on (Zero Voltage Switching operation). It is noted that in stationary operation time instants $t_8$ and $t_0$ represent practically the same situation and the next cycle starts over at time instant $t_8$.

It is noted that the waveforms illustrating the gate voltages $V_{GA}$, $V_{GB}$, $V_{GC}$, $V_{GD}$ are merely phase-shifted versions of each other and they all have the same on-time $T_1$, off-time $T_2$ and switching period $T_{PWM}$. As mentioned, the phase shift $\phi$ is adjusted to regulate the output voltage to match a desired set-point. Accordingly, when—ceteris paribus—the input voltage $V_{IN}$ decreases e.g. from 400 V to 350 V in the present example, then the controller circuit will have to reduce the phase shift $\phi$ from the value shown in FIG. 3 to almost zero as it is the case in the situation illustrated in FIG. 2. Similarly, when the output current increases or decreases, the controller circuit will have to increase or, respectively reduce the phase shift $\phi$ in order to maintain the output voltage $V_{OUT}$ at the desired level. It is noted that the general concept of how to control a PSFB converter by adjusting the phase shift $\phi$ is as such known and thus not explained in more detail herein.

Figure 4:
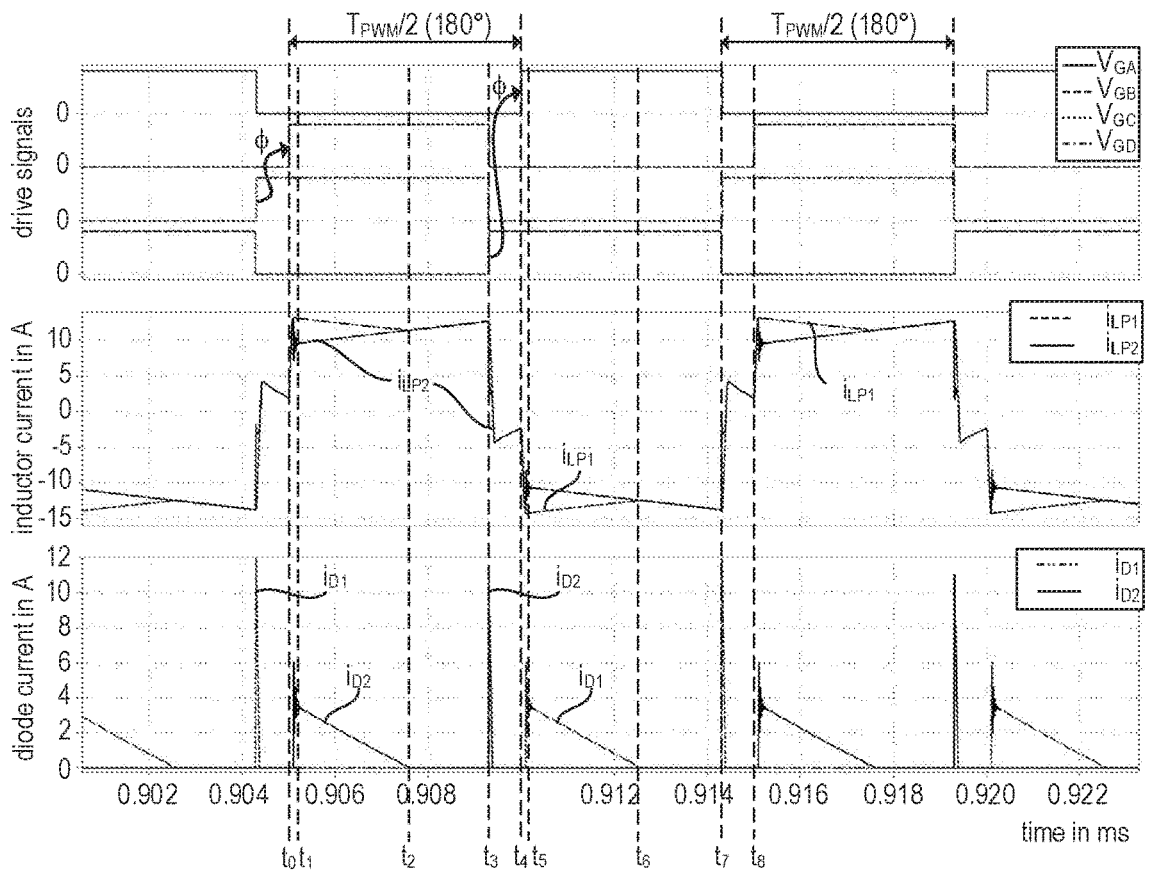
FIGS. 4 and 5 illustrate one example of a modified switching scheme, according to which the transistors in one half-bridge of the PSFB converter are switched off early as compared with the switching scheme of FIGS. 2 and 3.
Figure 5:
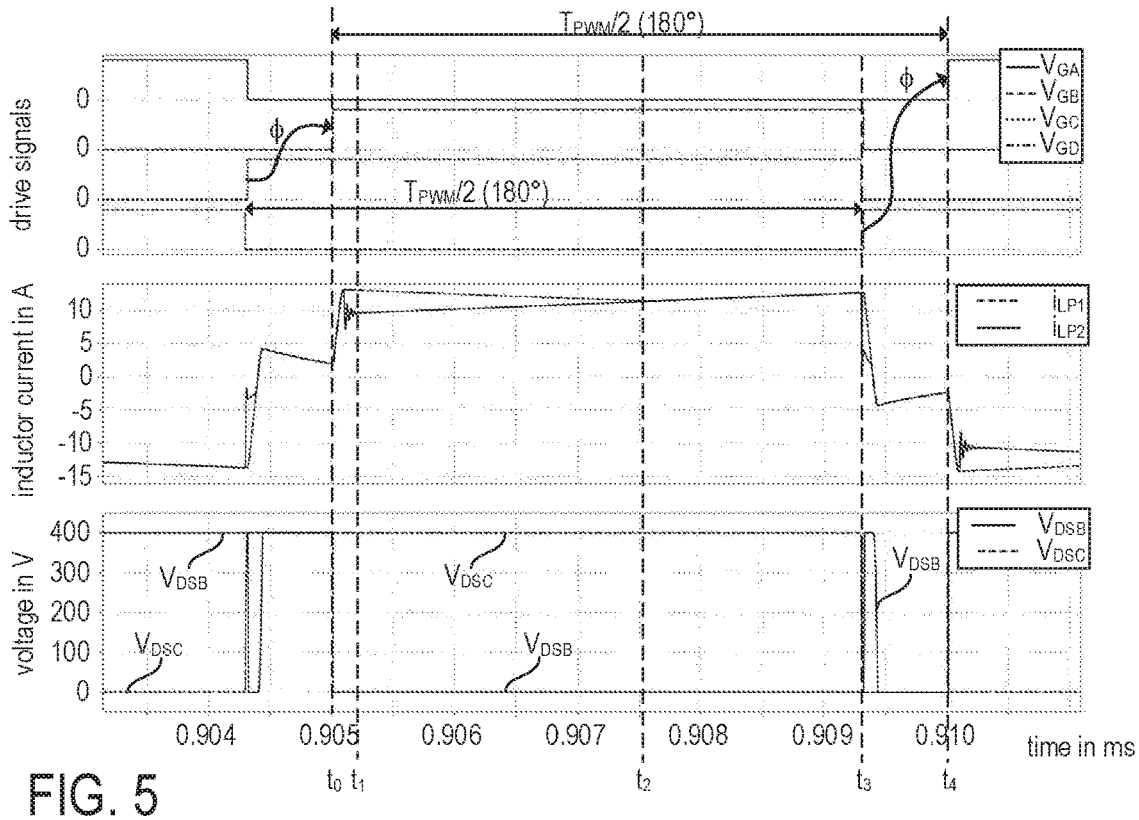

In the following, a modified switching scheme for a PSFB converter will be described that allows to reduce the length of the free-wheeling phase as well as the losses that come with free-wheeling. FIG. 4 includes timing diagrams illustrating examples of the drive signals for driving the MOSFETs $M_A$, $M_B$, $M_C$, and $M_D$, the resulting inductor currents $i_{LP1}$ and $i_{LP2}$ passing through the inductors $L_{P1}$ and $L_{P2}$, as well as the corresponding diode currents $i_{D1}$ and $i_{D2}$ (circulating currents) passing through the free-wheeling diodes $D_1$ and $D_2$. FIG. 5 includes corresponding timing diagrams illustrating the drive signals for driving the MOSFETs $M_A$, $M_B$, $M_C$, and $M_D$, the resulting inductor currents $i_{LP1}$ and $i_{LP2}$ passing through the inductors $L_{P1}$ and $L_{P2}$, and the corresponding voltage drops $V_{DSB}$ and $V_{DSC}$ across transistors $M_B$ and $M_C$. The diagram of FIG. 5 has a scaled (magnified) time-axis and represents only a short time segment of the diagram of FIG. 4. The labels $t_0$, $t_1$, $t_2$, $t_3$, and $t_4$ in FIGS. 4 and 5 denote the same time instants.

According to the switching scheme illustrated in FIGS. 4 and 5, transistor $M_B$ is switched on at time instant $t_0$. Transistor $M_C$ is already on at this time and transistor $M_D$ is off. Different from the previous example of FIG. 3, the transistor $M_A$ is not switched off at the same time $t_0$ as transistor $M_B$ is switched on. Instead, transistor $M_A$ has been switched off earlier, i.e. together with the switch-on transistor $M_C$ in the other half-bridge of the PSFB converter. After a short dead-time, power transfer from the primary side to the secondary side of the transformer occurs between time instants $t_1$ and $t_3$ (power conversion phase). During this phase, the MOSFETs $M_B$ and $M_C$ are active (i.e. switched on) and diode $D_2$ is conducting between time instants $t_1$ and $t_2$ while diode current $i_{D2}$ decreases between time instants $t_1$ and $t_2$ and reaches zero at time instant $t_2$; during time instants $t_2$ and $t_3$ the diode current $i_{D2}$ is zero. During this power conversion phase (i.e. from time instant $t_1$ to $t_3$), the secondary current $i_{LS}$ passes through rectifier diode $D_{R2}$, secondary winding $L_{S1}$ of the transformer and rectifier diode $D_{R3}$.

At time instant $t_3$, MOSFET $M_C$ is switched off, whereas MOSFET $M_D$ is switched on (Zero Voltage Switching operation). Different from the previous example of FIG. 3, the transistor $M_B$ is also switched off at time instant $t_3$ together with the switch-on of transistor $M_D$ in the other half-bridge of the PSFB converter (early switch-off of transistor $M_B$, see also FIG. 6). Because MOSFET $M_B$ now blocks the current path for the inductor current $i_{LP1}$ (primary current of the transformer), the current $i_{PL1}$ passes through the body diode $D_A$ of MOSFET $M_A$; the output capacitance of MOSFET $M_A$ is discharged accordingly. As a consequence, the recirculating current $i_{D2}$ passing through diode $D_2$ falls to zero immediately after time instant $t_3$. During most of the free-wheeling phase between time instant $t_3$ and $t_4$ the diode current $i_{D2}$ is almost zero. Due to a resonance of the inductor $L_{P1}$ and the output capacitance of MOSFET $M_A$, the body diode $D_B$ of MOSFET $M_B$ becomes forward biased. This corresponds to the short peak in the drain-source voltage $V_{DSB}$ of MOSFET $M_B$, which occurs immediately after time instant $t_3$ as shown in FIG. 5. After this peak the diode current is proportional to the capacitance and inductance values and thus not completely zero. At the end of the free-wheeling phase, at time instant $t_4$, the MOSFET $M_A$ is switched on, which is a hard commutation and not a ZVS operation because the body diode $D_B$ of MOSFET $M_B$ is conducting during the switching operation.

After a short dead-time after time instant $t_4$, the next power conversion phase begins at time instant $t_5$. During this phase, the MOSFETs $M_A$ and $M_D$ are active and diode $D_1$ is conducting between time instants $t_5$ and $t_6$ while diode current $i_{D1}$ decreases between time instants $t_5$ and $t_6$ and reaches zero at time instant $t_6$; during time instants $t_6$ and $t_7$ the diode current $i_{D1}$ is zero. During this power conversion phase (i.e. from time instant $t_5$ to $t_7$), the secondary current $i_{LS}$ passes through rectifier diode $D_{R4}$, secondary winding $L_{S1}$ of the transformer and rectifier diode $D_{R1}$.

At time instant $t_7$, MOSFET $M_D$ is switched off, whereas MOSFET $M_C$ is switched on (Zero Voltage Switching operation). Different from the previous example of FIG. 3, the transistor $M_A$ is also switched off at time instant $t_7$ together with the switch-on of transistor $M_C$ in the other half-bridge of the PSFB converter (early switch-off of transistor $M_A$, see also FIG. 6). Because MOSFET $M_A$ now blocks the current path for the inductor current $i_{LP1}$ (primary current of the transformer), the current $i_{PL1}$ passes through the body diode $D_B$ of MOSFET $M_B$; the output capacitance of MOSFET $M_B$ is discharged accordingly. As a consequence, the recirculating current $i_{D1}$ passing through diode $D_1$ falls to zero immediately after time instant $t_7$. During most of the free-wheeling phase between time instant $t_7$ and $t_8$ the diode current $i_{D1}$ is almost zero. Due to a resonance of the inductor $L_{P1}$ and the output capacitance of MOSFET $M_B$, the body diode $D_A$ of MOSFET $M_A$ becomes forward biased. At the end of the free-wheeling phase, at time instant $t_8$, the MOSFET $M_B$ is switched on, which is a hard commutation and not a ZVS operation because the body diode $D_A$ of MOSFET $M_A$ is conducting during the switching operation.

To summarize the above, during operation, the controller circuit that generates the drive signals $V_{GA}$, $V_{GB}$, $V_{GC}$, and $V_{GD}$ may control/adjust the phase shift $\phi$ between the drive signals $V_{GA}$ and $V_{GB}$ for the first half-bridge and the drive signals $V_{GC}$, and $V_{GD}$ for the second half bridge so as to maintain the output voltage $V_{OUT}$ at a desired set-point level. The drive signals of the transistors of the first half-bridge (i.e. $V_{GA}$ and $V_{GB}$) are in phase opposition to each other, i.e. have a temporal offset of $T_{PWM}/2$ or 180°. The same applies to the drive signals of the transistors of the second half-bridge (i.e. there is a temporal offset of $T_{PWM}/2$ between the rising edges of $V_{GA}$ and $V_{GC}$ as well as between the rising edges of $V_{GB}$ and $V_{GD}$). However, different to the previous example of FIG. 3 the first drive signal $V_{GA}$ is generated so that the first high-side transistor $M_A$ in the first half bridge is switched off when the third drive signal $V_{GC}$ indicates to switch on the second high-side transistor M$_C$ in the second half-bridge (early switch-off of transistor M$_A$). Similarly, the second drive signal V$_{GB}$ is generated so that the first low-side transistor M$_B$ in the first half-bridge is switched off when the fourth drive V$_{GD}$ signal indicates to switch on the second low-side transistor M$_D$ in the second half-bridge (early switch-off of transistor M$_B$).

It is noted that, although transistors M$_A$ and M$_B$ of the first half-bridge are switched off early as compared to the situation shown in FIG. 3, the duration of a switching period T$_{PWM}$ is unchanged and the same as in the conventional switching scheme illustrated in FIG. 3. Further, the mentioned early switch-off does not affect the temporal offset of T$_{PWM}$/2 between the rising edges of the drive signals V$_{GA}$ and V$_{GB}$, which drive the transistors M$_A$ and M$_B$ of the first half-bridge. Nevertheless, the early switch-off of the transistors M$_A$ and M$_B$ of the first half-bridge changes the duty cycle of the respective drive signals V$_{GA}$, V$_{GB}$. However, as the longer off-time in signals V$_{GA}$ and V$_{GB}$ (as compared to the conventional switching scheme illustrated in FIG. 3) only affects the free-wheeling phase and not the power conversion phase and thus has no impact on the regulation of the output voltage V$_{OUT}$, which can still be adjusted by adjusting the phase shift φ, which corresponds to a temporal offset of T$_{PWM}$·φ/360°)

Figure 6:
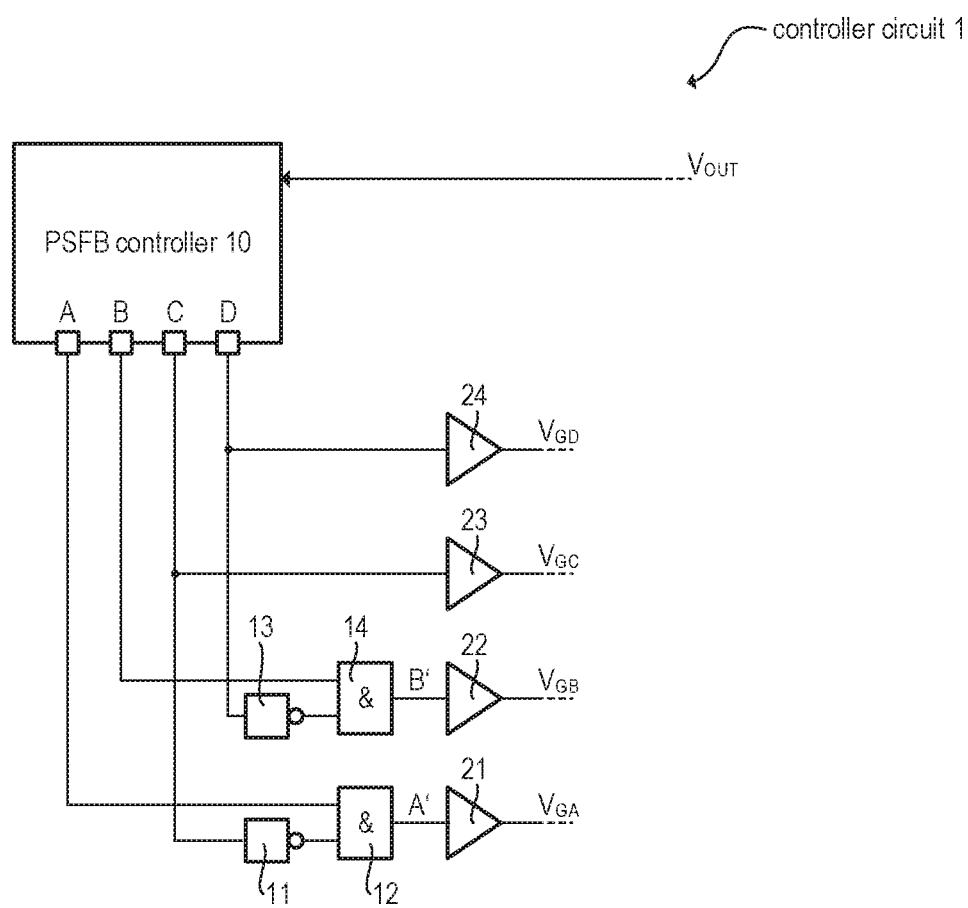
FIG. 6 is one example of a circuit configured to generate the switching signals in accordance with the switching scheme of FIGS. 4 and 5.

FIG. 6 illustrates one simple example of a controller circuit 1 which is configured to generate the drive signals for the transistors M$_A$, M$_B$, M$_C$, and M$_D$ of an FSFP converter that form the full-bridge (see FIG. 1). Practically, a PSFB converter includes a full-bridge composed of two half-bridges, wherein, in the examples described herein, M$_A$ denotes the high-side transistor of the first half bridge. M$_B$ denotes the low-side transistor of the first half bridge, M$_C$ denotes the high-side transistor of the second, and M$_D$ denotes the low-side transistor of the second half bridge. The switching converter includes a controller circuit, an example of which is depicted in FIG. 6, and the function of which has been described above with reference to FIGS. 4 and 5. Generally, the controller circuit 1 is configured to generate the first drive signal V$_{GA}$ for the first high-side transistor M$_A$, the second drive signal V$_{GB}$ for the first low-side transistor M$_B$, the third drive signal V$_{GC}$ for the second high-side transistor M$_C$ and a fourth drive signal V$_{GD}$ for the second low-side transistor M$_D$(cf. also FIG. 1).

The first drive signal V$_{GA}$ and the second drive signal V$_{GB}$ are periodic with a cycle period T$_{PWM}$ and pulse-width modulated (e.g. with a duty cycle of 50 percent) and have a temporal offset to each other, which equals half of the period T$_{PWM}$ (see FIGS. 4 and 5, the rising edges of V$_{GA}$ have a temporal offset of T$_{PWM}$/2 with respect to the corresponding rising edges of V$_{GB}$). Similarly, the third drive signal V$_{GC}$ and the fourth drive signal V$_{GD}$ are also periodic with the same cycle period T$_{PWM}$ and pulse-width modulated and have the temporal offset of T$_{PWM}$/2 to each other (see FIG. 4, the rising edges of V$_{GC}$ have a temporal offset of T$_{PWM}$/2 with respect to the corresponding rising edges of V$_{GD}$). The first and the second drive signal are phase shifted-with respect to the third and the fourth drive signal (see FIG. 4, phase φ). Further, the controller circuit is configured to generate the first drive signal V$_{GA}$ so that the first high-side transistor M$_A$ is switched off when the third drive signal M$_C$ indicates to switch on the second high-side transistor M$_C$ (see FIG. 4, the falling edge of V$_{GA}$ coincides with the rising edge of V$_{GC}$ at time instant t$_7$), and to generate the second drive signal V$_{GB}$ so that the first low-side transistor M$_B$ is switched off when the fourth drive signal V$_{GD}$ indicates to switch on the second low-side transistor M$_D$ (see FIG. 5, the falling edge of V$_{GB}$ coincides with the rising edge of V$_{GD}$ at time instant t$_3$).

The example of FIG. 6 further illustrates how a standard PSFB controller 10, which generates the switching signals A, B, C, and D for transistors M$_A$, M$_B$, M$_C$, and M$_D$, respectively, in accordance with the common switching scheme illustrated in FIGS. 2 and 3, can be used to generate the switching signals according to the novel switching scheme illustrated in FIGS. 4 and 5. Therefore, the switching signals A and B are modified and the modified Signals A' and B' as well as the signal C and D are used to generate the drive signals V$_{GA}$, V$_{GB}$ V$_{GC}$, and V$_{GD}$ e.g. using common gate driver circuits.

According to the example of FIG. 6, the PSFB controller provides logic signals A B, C, and D to be provided to gate driver circuits 21, 22, 23, and 24, respectively, which provide the corresponding gate voltages V$_{GA}$, V$_{GB}$, V$_{GC}$, and V$_{GD}$ (see also FIG. 1). However, in order to achieve the switching scheme of FIG. 4, the logic signals A, and B are modified and the modified logic signals A' and B' are supplied to the gate drivers 21 and 22 for MOSFETs M$_A$ and M$_B$. The modified logic signals A' and B' are obtained according to the following equations:

$$A'=A\&(NOT\ C), \quad (1)$$

$$B'=B\&(NOT\ D). \quad (2)$$

In the example of FIG. 6, the AND-operations are implemented by AND-gates 12 and 14, and the NOT-operations are implemented by the inverters 11 and 13. Accordingly, inverter 11 receives logic signal C and AND-gate 12 receives logic signal A and the output signal of inverter 11. Similarly, inverter 13 receives logic signal D and AND-gate 14 receives logic signal B and the output signal of inverter 13.

The modified logic signal A' indicates an "early" switch-off of MOSFET M$_A$ at the time instant, the logic signal C indicates a switch-on of MOSFET M$_C$. Similarly, the modified logic signal B' indicates an "early" switch-off of MOSFET M$_B$ at the time instant, the logic signal D indicates a switch-on of MOSFET M$_D$. As a result, the time period during which a recirculating current passes through diodes D$_1$ or D$_2$ is significantly shortened as explained above with reference to FIGS. 4 and 5.

The specific example FIG. 6 has been chosen because it clearly illustrates the difference between the standard switching scheme of FIGS. 2 and 3 and the modified switching scheme of FIGS. 4 and 5. It is understood that any other circuitry may be used to generate the switching signals A', B', C, and D. For example, a microcontroller or any other programmable device, which includes a processor for executing software instructions, may be programmed to generate the switching signals A', B', C, and D instead of using a dedicated PSFM controller.

Although the invention has been illustrated and described with respect to one or more implementations, alterations and/or modifications may be made to the illustrated examples without departing from the spirit and scope of the appended claims. In particular regard to the various functions performed by the above described components or structures (units, assemblies, devices, circuits, systems, etc.), the terms (including a reference to a "means") used to describe such components are intended to correspond—unless otherwise indicated—to any component or structure, which performs the specified function of the described component (e.g., that is functionally equivalent), even though not structurally equivalent to the disclosed structure, which performs the function in the herein illustrated exemplary implementations of the invention.

What is claimed is:

1. A phase-shifted full bridge switching converter, comprising:
   a transistor full-bridge including a first half-bridge comprising a first high-side transistor and a first low-side transistor, and a second half-bridge comprising a second high-side transistor and a second low-side transistor; and
   a controller circuit configured to generate a first drive signal for the first high-side transistor, a second drive signal for the first low-side transistor, a third drive signal for the second high-side transistor and a fourth drive signal for the second low-side transistor,
   wherein the first drive signal and the second drive signal are periodic with a cycle period, pulse-width modulated and have a temporal offset to each other that equals half of the cycle period,
   wherein the third drive signal and the fourth drive signal are periodic with a cycle period, pulse-width modulated and have a temporal offset to each other that equals half of the cycle period,
   wherein the first drive signal and the second drive signal are phase shifted with respect to the third drive signal and the fourth drive signal,
   wherein the controller circuit is further configured to generate the first drive signal so that the first high-side transistor is switched off when the third drive signal indicates to switch on the second high-side transistor, and to generate the second drive signal so that the first low-side transistor is switched off when the fourth drive signal indicates to switch on the second low-side transistor.

2. The phase-shifted full bridge switching converter of claim 1, wherein the controller circuit is configured to generate the first drive signal, the second drive signal, the third drive signal and the fourth drive signal as pulse-width modulated signals with a duty cycle of 50 percent.

3. The phase-shifted full bridge switching converter of claim 1, wherein the phase shift determines an output voltage of the switching converter.

4. The phase-shifted full bridge switching converter of claim 3, wherein the controller circuit is configured to set the phase shift based on the output voltage of the switching converter.

5. The phase-shifted full bridge switching converter of claim 1, wherein the first high-side transistor and the first low-side transistor are connected at a first circuit node, wherein the second high-side transistor and a second low-side transistor are connected at a second circuit node, wherein the first half-bridge and the second half-bridge are both connected between a first supply node and a second supply node, and wherein the switching converter further comprises:
   a series circuit comprising a first inductor and a second inductor connected at a third circuit node, the series circuit being connected between the first circuit node and the second circuit node;
   a first free-wheeling diode coupled between the third circuit node and the first supply node;
   a second free-wheeling diode coupled between the third circuit node and the second supply node;
   a transformer having a primary winding and a secondary winding, the primary winding being the first inductor; and
   a rectifier coupled to the secondary winding and configured to rectify the secondary current passing through the secondary winding.

6. The phase-shifted full bridge switching converter of claim 5, further comprising:
   an output filter connected between an output node and the rectifier, and configured to smooth a voltage provided by the rectifier.

7. A method for controlling a phase-shifted full bridge switching converter, the method comprising:
   generating a first drive signal for a first high-side transistor, a second drive signal for a first low-side transistor, a third drive signal for a second high-side transistor and a fourth drive signal for a second low-side transistor of the switching converter,
   wherein the first drive signal and the second drive signal are periodic with a cycle period, pulse-width modulated and have a temporal offset to each other that equals half of the cycle period,
   wherein the third drive signal and the fourth drive signal are periodic with the cycle period, pulse-width modulated and have a temporal offset to each other that equals half of the cycle period,
   wherein the first drive signal and the second drive signal are phase shifted with respect to the third drive signal and the fourth drive signal;
   wherein the first drive signal is generated so that the first high-side transistor is switched off when the third drive signal indicates to switch on the second high-side transistor,
   wherein the second drive signal is generated so that the first low-side transistor is switched off when the fourth drive signal indicates to switch on the second low-side transistor.

8. The method of claim 7, wherein the first drive signal, the second drive signal, the third drive signal and the fourth drive signal are pulse-width modulated with a duty cycle of 50 percent.

9. The method of claim 7, further comprising:
   setting the phase shift in response to an output voltage of the switching converter.

10. The method of claim 7, wherein the first high-side transistor and the first low-side transistor are connected at a first circuit node to form a first half-bridge, wherein the second high-side transistor and the second low-side transistor are connected at a second circuit node to form a first half-bridge, wherein the switching converter includes a transformer having a primary winding coupled between the first circuit node and the second circuit node, the method further comprising:
    rectifying a current passing through a secondary winding of the transformer.

11. A phase-shifted full bridge switching converter, comprising:
    a transistor full-bridge including a first half-bridge comprising a first high-side transistor and a first low-side transistor, and a second half-bridge comprising a second high-side transistor and a second low-side transistor; and
    a controller circuit configured to generate a first drive signal for the first high-side transistor, a second drive signal for the first low-side transistor, a third drive signal for the second high-side transistor and a fourth drive signal for the second low-side transistor, wherein the first drive signal and the second drive signal are periodic with a cycle period, pulse-width modulated and have a temporal offset to each other that equals half of the cycle period, wherein the third drive signal and the fourth drive signal are periodic with a cycle period, pulse-width modulated and have a temporal offset to each other that equals half of the cycle period, wherein the first drive signal and the second drive signal are phase shifted with respect to the third drive signal and the fourth drive signal, wherein the controller circuit is further configured to generate the first drive signal so that the first high-side transistor is switched off when the third drive signal indicates to switch on the second high-side transistor, and to generate the second drive signal so that the first low-side transistor is switched off when the fourth drive signal indicates to switch on the second low-side transistor, wherein when the second low-side transistor is switched off, the second high-side transistor is switched on and the first high-side transistor is switched off, the first low-side transistor being switched on after a predetermined phase shift, wherein when the second high-side transistor is switched off, the second low-side transistor is switched on and the first low-side transistor is switched off, the first high-side transistor being switched on after the predetermined phase shift.

* * * * *